United States Patent Office 3,551,382
Patented Dec. 29, 1970

3,551,382
STRUCTURE CONTROL ADDITIVE FOR CON-
VERTIBLE ORGANOPOLYSILOXANES, AND
PREPARATION THEREOF
Karl Schnurrbusch, Leverkusen-Steinbuechel, and Wil-
fried Kniege, Cologne-Muelheim, Germany, assignors
to Farbenfabriken Bayer Aktiengesellschaft, Lever-
kusen, Germany, a corporation of Germany
No Drawing. Filed Apr. 10, 1968, Ser. No. 720,364
Claims priority, application Germany, Apr. 19, 1967,
F 52,179
Int. Cl. C08g 31/02
U.S. Cl. 260—46.5                                2 Claims

ABSTRACT OF THE DISCLOSURE

Compositions comprising linear organopolysiloxanes convertible into the solid elastic state by heating in the presence of an organic peroxide, finely divided silica such as fume silica as reinforcing filler, and diphenyl-silane-diol as structure control additives are well known in the art. In the following a satisfactory process of the production of finely divided diphenyl-silane-diol is disclosed in which process diphenyldichlorosilane is poured with very intensive stirring into a large excess of weakly alkaline water at below 40° C. The diphenyl-silane-diol precipitate obtained thereby is filtered off, washed, dried, ground to a particle size of less than 50 microns, and forthwith mixed with an approximately equal amount of a convertible organopolysiloxane. The preparation thus obtained can be stored without risk of agglomeration and can easily be used as structure control additive at any later time.

---

The present invention relates to finely divided diphenyl-silane-diol and to its use in the production of organopolysiloxane elastomers which are reinforced with finely dispersed silica fillers.

It is known that the advantageous effect of these silica fillers on the mechanical properties of the final product increases with the evenness of the filler division, and that this division is furthered by certain additives among which diphenyl-silane-diol has proved highly efficient. It is also known that, after a short storage time, the aforesaid fillers give rise to a considerable strengthening, the so-called "crepe aging" of the mixture with the organopolysiloxanes; before molding these mixtures, therefore, they must be subjected to a replasticizing process, which is expensive. This disadvantage is substantially overcome by the use of the aforesaid additives, so-called structure control additives (see e.g., U.S. patent specification No. 2,890,188 and British patent specification 779,788).

In order to obtain full advantage of the favourable effect of the diphenyl-silane-diol described above, it is necessary that this compound also be used in a uniform fine division and that it be free from agglomerates and oily polycondensates; this is of considerable importance, in particular, for higher electrotechnical demands. The hitherto known processes for the production of a product suitable for this purpose use some form of dissolving process, for example in acetone, in order to obviate the formation of polycondensates as well as contamination with residual chlorosilane or HCl (see, e.g., U.S. patent specification No. 2,899,453). These known processes are time-consuming and economically unsatisfactory; moreover, they do not completely ensure the desired purity of the monomers.

We have now found that diphenyl-silane-diol preparations of very high effectiveness can be obtained in a process which can easily be carried out without the use of a solvent, and according to the invention a process for the production of finely divided diphenyl-silane-diol, suitable for use as a structure control additive in filler-containing, convertible organopolysiloxanes, comprises pouring diphenyl-dichlorosilane over the rotor of an intensive stirrer running at a speed of at least 1000 r.p.m. into at least ten times the amount by weight thereof of a weakly alkaline solution of ammonia or an alkali metal carbonate or bicarbonate at a temperature below 40° C., filtering off the powder thus precipitated, washing and drying said powder, and grinding said powder to a particle size of less than 50 microns, while maintaining a temperature of below 40° C.

In order to facilitate the grinding and to keep the temperature at a low level, the material to be ground can be admixed with finely divided silica or similar powders as grinding auxiliary and with Dry Ice as cooling agent. The diphenyl-silane-diol withdrawn from the grinding mill has a bulk weight between 120 and 150 g./litre, but this begins to increase substantially after a few hours. A diphenyl - silane - diol - containing additive for use in the aforesaid organopolysiloxane compositions is made, according to the invention, by admixing finely divided diphenyl-silane-diol produced as above, within 6 hours of termination of the grinding step, with an approximately equal amount of an organopolysiloxane capable of being converted to form an elastomer. Such timely dispersion of the fine powder prevents the latter from losing some of its effectiveness, and there is thus obtained an additive which is stable to storage and can easily be admixed when it is used at a later date.

The following examples are given for the purpose of illustrating the invention.

EXAMPLE 1

5 kg. $Na_2CO_3$ are dissolved in 200 litres of water. A stirring device which is commercially available from Hans Kotthoff, Rodenkirchen near Cologne, under the trade name "Mischsirene" is immersed in this solution, and 10 kg. diphenyldichlorosilane are poured, in the course of 90 minutes, over the rotor of the stirring device running at a speed 1400 r.p.m., the temperature being kept below 40° C. The diphenyl-silane-diol thus hydrolytically formed is obtained as a fine precipitate which is filtered off, washed with water and dried. It is then ground in a pin mill running at a rate of 12,000 r.p.m. together with sufficient solid carbon dioxide for the temperature of the material in the mill to remain below 30° C. The powder then obtained with a particle size of 30 to 40 microns is mobile and has a bulk weight of 150 g./litre.

This powder is mixed forthwith with the same amount by weight of a polydiorganosiloxane of approximately $10^6$ cst. viscosity (20° C.), prepared in known manner by alkaline polymerisation of a mixture of 1 part by weight tetramethyl-tetra-vinyl-cyclotetrasiloxane and 499 parts by weight octamethylcyclotetrasiloxane, and there is thus obtained a soft white preparation which can be used as an additive after storage for any length of time.

In order to ascertain the criticality of the time which is allowed to lapse between the grinding of the diphenyl-silane-diol and the dispersing of the powder in the polydiorganosiloxane, hereinafter referred to as the "standing time," a series of 12 additive preparations, which differed only in respect of their standing times, were prepared in the manner described above. With each of these preparations there was produced, on a mixing roll as is customarily used for this purpose, a mixture capable of being cross-linked to form a siloxane elastomer and consisting of 95 parts by weight of the polydiorganosiloxane used for the preparations described above, 36 parts by weight of a finely divided silica obtained by flame hydrolysis and commercially available as filler, and 10 parts by weight of the additive concerned, the additive containing 5 parts by weight diphenyl-silane-diol. Each mixture was stored at room temperature for 4 weeks; this is known to lead to a certain hardening. The time required to re-plasticize each of the mixtures on a roll mill until the original viscosity was attained was then determined, and the results are as follows:

| Preparation: | Standing time | Replasti- cising time, minutes |
|---|---|---|
| 1 | 30 minutes | 2.5 |
| 2 | 1 hour | 3 |
| 3 | 2 hours | 3 |
| 4 | 3 hours | 3 |
| 5 | 4 hours | 3 |
| 6 | 5 hours | 3.5 |
| 7 | 6 hours | 4 |
| 8 | 7 hours | 7 |
| 9 | 8 hours | 8 |
| 10 | 16 hours | 8.5 |
| 11 | 24 hours | 8.5 |
| 12 | 72 hours | 8.5 |

Microscopic investigation carried out after replasticising showed a few small agglomerates of diphenyl-silane-diol in the mixture prepared after six hours' standing time (Preparation 7); Preparations 8 to 12 exhibited a greater number of these agglomerates, whereas no indications thereof could be found in Preparations 1 to 6.

EXAMPLE 2

7 kg. NaHCO$_3$ are dissolved in 300 litres of water and the hydrolysis of 10 kg. diphenyl-dichloro-silane is then carried out in the manner described in Example 1. The resulting dried diphenyl-silane-diol is ground in a jet mill with air at 6 atmospheres gauge and at room temperature, and there is thus obtained a powder with a particle size of 25 to 30 microns and a bulk weight of 140 g./litre.

This powder is mixed forthwith with the same amount by weight of a polydiorganosiloxane which has been prepared in known manner by alkaline polymerization of a mixture of 1 part by weight tetramethyl-tetravinyl-cyclotetrasiloxane, 19 parts by weight octaphenyl-cyclotetrasiloxane and 230 parts by weight octamethyl-cyclotetrasiloxane and has a viscosity of between $10^5$ and $10^6$ cst. (20° C.).

A series of nine additive preparations produced in this way, but again observing different "standing times" (see Example 1) were tested for their suitability for electrotechnical purposes as follows:

In a dissolving kneader, 9.5 parts by weight of the preparation to be tested were mixed with 100 parts by weight of the polydiorganosiloxane used for its production, 33 parts by weight of finely dispersed silica obtained by flame hydrolysis, 26 parts by weight of fine quartz powder, 0.8 part by weight titanium dioxide pigment, 1 part by weight polymethyl-hydrogen-siloxane of 50 cst. viscosity (20° C.) and 2.1 parts by weight vinyl-triethoxysilane, a temperature of between 165 and 170° C. being maintained. The mixtures were subsequently cooled to room temperature, strained through a screen No. 0.100 (according to DIN instruction 1171), and mixed with 0.9 percent of their weight of 1,4-di-(tert.-butyl-peroxy-isopropyl)-benzene.

The mixtures thus prepared were used as insulation for single conductor cables of the type SSGA–14 according to U.S. Navy Regulation MIL–C–2194, the cross-linking of the applied mixtures being continuously carried out in steam at 12 atmospheres gauge. In each case, 1000 m. of these cables were continuously drawn through one of the conventional devices for testing the break-down strength, and there exposed to an electric voltage of 6000 volts, i.e. in the usual manner to twice the minimum break-down voltage of 3000 volts required for cable constructions of this type. The frequency of break-downs observed gives information about the evenness of the cable insulation and about any inhomogeneities caused by agglomerates. The test results for the nine cable were as follows:

| Preparation: | Standing time | Per 1000 m. of cable |
|---|---|---|
| 1 | 30 minutes | No break-down. |
| 2 | 1 hour | Do. |
| 3 | 3 hours | Do. |
| 4 | 4 hours | Do. |
| 5 | 5 hours | Do. |
| 6 | 6 hours | 2 break-downs. |
| 7 | 7 hours | 4 break-downs. |
| 8 | 8 hours | 5 break-downs. |
| 9 | 72 hours | Do. |

EXAMPLE 3

1 kg. ammonia water containing 25 percent by weight NH$_3$ is added to 300 litres of water, and a further 7 kg. of ammonia water and 15 kg. diphenyl-dichlorosilane are simultaneously added with stirring in the manner described in Example 1, and in the course of 2 hours. After filtering, washing and drying, the precipitated diphenyl-silane-diol is ground in a pin mill (12,000 r.p.m., temperature below 30° C.) with the addition of finely divided silica as grinding auxiliary. The powder thus obtained, with a particle size of 20 to 30 micron (bulk weight 120 g./litre), is mixed with the same amount by weight of the polydiorganosiloxane used in Example 1.

When, in three tests, 1, 5 and 24 hours are allowed to elapse before dispersing, and the diphenyl-silane-diol additive preparations then produced are strained through a screen No. 0.100 (according to DIN Instruction No. 1171), 0.1% of screen residue will be found in the case of the two dispersions prepared after 1 and 5 hours respectively, but 0.8% of the dispersion prepared after 24 hours will be found to remain in the screen.

What is claimed is:

1. Process for the production of a diphenyl-silane-diol-containing additive for convertible organopolysiloxane compositions which comprises preparing finely divided diphenyl-silane-diol by steps comprising pouring diphenyl-dichlorosilane over the rotor of an intensive stirrer running at a speed of at least 1000 r.p.m. into at least ten time the amount by weight thereof of a weakly alkaline aqueous solution of ammonia or an alkali metal carbonate or bicarbonate at a temperature below 40° C., filtering off the powder thus precipitated, washing and drying said powder, and grinding said powder to a particle size of less than 50 microns, while maintaining a temperature of below 40° C., within 6 hours of termination of the grinding step mixing the finely divided diphenyl-silane-diol with an organopolysiloxane capable of being converted to form an elastomer.

2. Process according to claim 1, wherein the amount of organopolysiloxane with which the diphenyl-silane-diol is mixed is about equal to the amount of diphenyl-silane-diol.

References Cited

UNITED STATES PATENTS

| 2,600,307 | 6/1952 | Lucas et al. | 260—448.2 |
| 2,717,258 | 9/1955 | Kantor | 260—448.2 |
| 2,890,188 | 6/1959 | Konkle et al. | 260—37(Si)X |
| 2,899,453 | 8/1959 | Spector et al. | 260—37(Si)X |
| 3,223,474 | 12/1965 | Nitzsche et al. | 260—448.2X |

MORRIS LIEBMAN, Primary Examiner

L. T. JACOBS, Assistant Examiner

U.S. Cl. X.R.

260—37